United States Patent Office 3,429,437
Patented Feb. 25, 1969

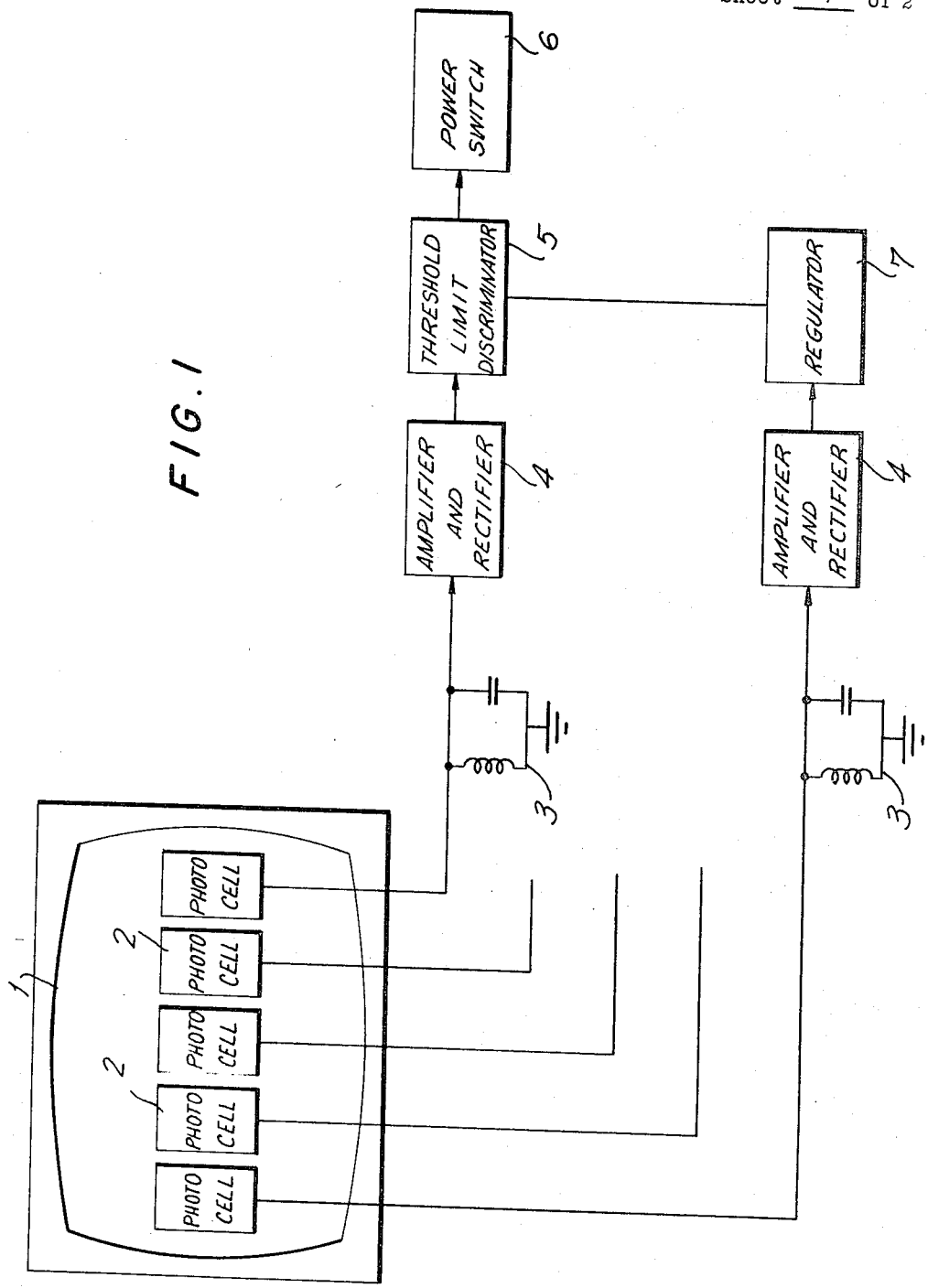

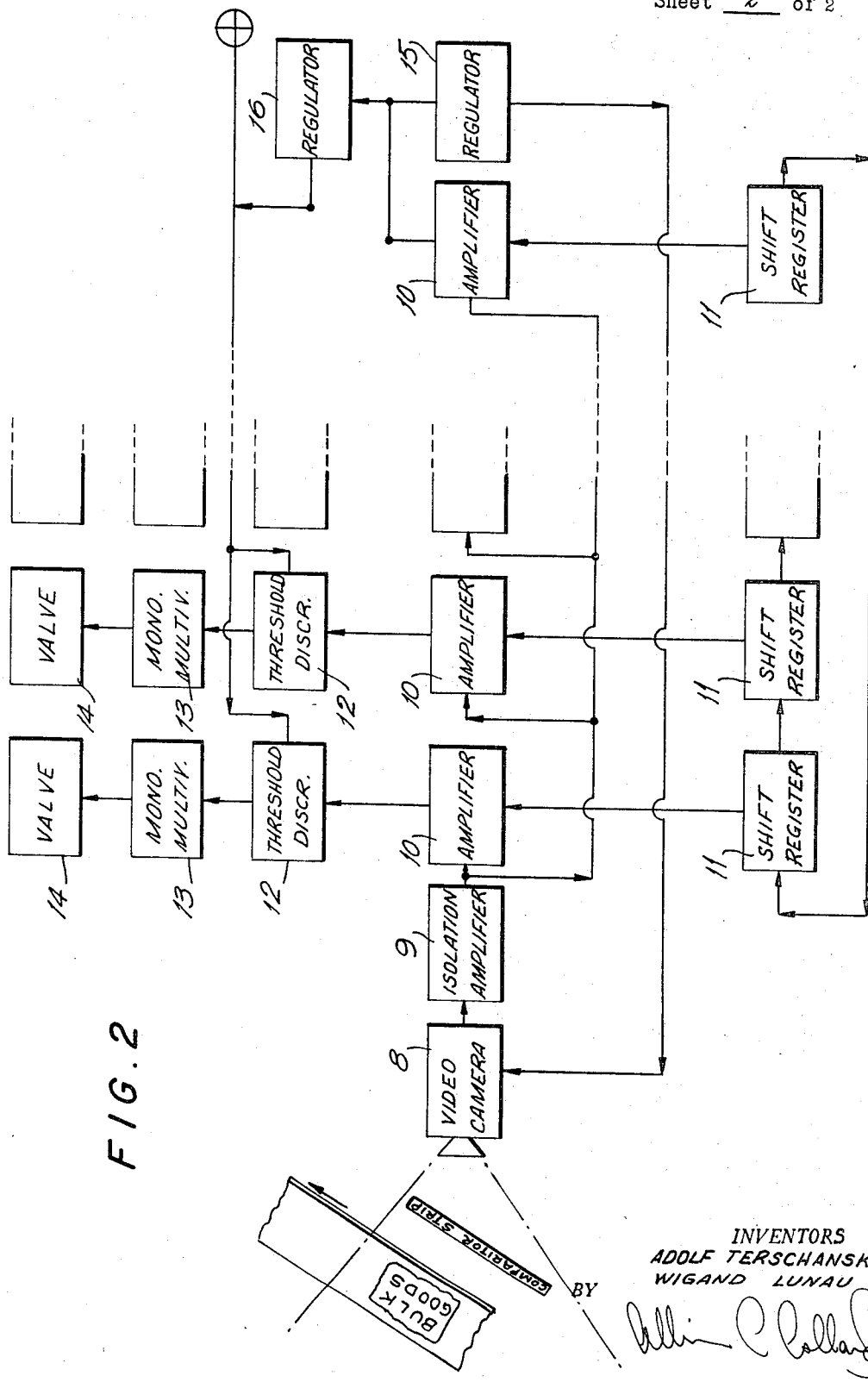

3,429,437
METHOD FOR SORTING BULK GOODS
Adolf Terschanski, Neviges, and Wigand Lunau, Wulfrath, Germany, assignors to Rheinische Kalksteinwerke G.m.b.H., Wulfrath, Germany
Filed July 6, 1967, Ser. No. 651,581
Claims priority, application Germany, July 15, 1966, R 43,702
U.S. Cl. 209—111.5                    4 Claims
Int. Cl. B07c 5/34

ABSTRACT OF THE DISCLOSURE

A method for sorting of bulk goods for determining quality differences, deficiencies, etc. by utilizing reflected or penetrating radiant energy and detecting the energy with a television camera having picture lines which move substantially lateral with respect to the movement of the goods. Discriminator circuits which are connected to the output of the video amplifiers of the television set have their threshold value adjusted automatically to compensate for lighting and amplification fluctuations. The signals produced at the output of the discriminators control the mechanical marking or sorting devices which affect the continuous flow of the bulk goods.

---

The present invention relates in general to method for sorting bulk goods with respect to quality differences and deficiencies.

More specifically, the present invention relates to a method of detecting quality differences and deficiencies in goods with a radiant energy penetration or reflection method, and utilizing the received signals to control mechanical marking or sorting devices.

Methods of automatically sorting bulk goods, minerals and other similar bulk goods with respect to differences in quality or material properties are well known in the art. To measure these differences penetrating or reflected energy rays are often employed and the degree of absorption or reflection of the rays is measured by a monitoring cell system.

The monitoring system may also be used, if desired, for controlling discharging devices by means of timing and synchronizing elements.

Further methods are known wherein the penetration or reflection ray methods also measure the density of the bulk goods to define a quality difference or deficiency in addition to measuring the surface properties of these goods.

To improve the above-described methods special arrangements of the photo measuring elements or the illuminating device in the measuring cell system are known.

Conventional devices are also known to control the flow of bulk goods by utilizing a plurality of measuring cell system employing electro-magnetic waves of different types to measure differences in quality and/or deficiencies.

However, the above-described known methods are not satisfactory for smooth operating conditions because they are too expensive. A further disadvantage inherent in these methods is that it is extremely difficult to achieve and maintain a synchronized flow of bulk goods when using a plurality of measuring cell systems.

Moreover, the synchronized movement of a quantity of a bulk line of goods is considerably hampered due to contamination and temperature increases during the operation of the devices.

In accordance with the invention and to overcome the above-mentioned shortcomings, the present invention uses a video camera to produce the electrical measurement signals. The use of a video camera for producing electrical signals for marking or sorting goods has a number of advantages with respect to the known prior art. A single video camer can, for example, replace a complicated arrangement of the known measuring cell systems consisting of light sources, photocells, and the like. With a video camera having a suitable lens one operator could watch a given broad flow of bulk goods. With this method one can also avoid complicated switching arrangements needed for a large number of measuring cell systems.

Moreover, there is no deviation in the synchronized flow of the various bulk goods as a result of the heating and/or contamination of the individual measuring cells. The feedback of bulk goods can also be facilitated by using a video camera which can be easily adjusted to maintain a constant sensitivity. Minor differences in materials can be easily recognized by adjusting the contrast of the video camera. To analyse the received signals for controlling the sorting or marking device connected to the video system, simple alternating current amplifiers may be used since the output of the video camera produces periodic signals. By using commercially available switching arrangements it is possible to reproduce the darker tone values of the video camera.

The video camera used in the present invention may be a commercially available television model. The scanning line standard of the television camera is not critical. For special cases, it may be recommended to use a camera having a color filter or a color camera of any given system.

The present invention may not only be used for measuring reflected energy, but also for measuring penetrating rays as well. If the used rays cannot be easily focused, or cannot be focused at all, it is advantageous to utilize an intermediary fluorescent screen. The visible face of focused ray emission will be picked up by the camera and transformed into usable pulse information. If desired, this method of penetrating ray measurement may be used individually or together with reflection measurement.

The signals produced at the output of the television camera may be transmitted to a picture monitoring device. The control signals for the sorting devices may then be picked up from the picture monitoring device by means of suitable photocells mounted on its receiving screen. However, if the television camera is placed substantially lateral with respect to the movement of the bulk goods so that the picture line also becomes placed substantially lateral with respect to the movement of the bulk goods, it is then more advantageous to couple the electrical signals of at least one picture line to a ring counter having $n$ elements and directly coupled to the picture line. The rotational frequency of the ring counter will correspond to the picture line length and the switching on time of elements $1/n$ corresponds to the length of the picture line. In this case no intermediary photocells are needed and the picture of the receiving camera may be used directly for control purposes. Defined conveyor belts are arranged with respect to each element of the ring counter and the corresponding bulk release mechanisms are made responsive to the voltage amplitudes representing the light of the signal. It is also possible to arrange the sweep of the picture lines in the direction of movement of the bulk goods and to feed a number of picture lines in accordance with average means to each of the discharge devices. By applying this method, however, it should be noted that the sorting speed is greatly influenced by the picture frequency.

To apply the novel method a commercially available television camera and picture monitoring device may be used. If the signals are sensed on the picture screen by means of photocells, they may be fed after modulation in accordance with their light amplitude to an amplifier arrangement. The amplifier arrangement consists of a filter element with an amplifier and a series rectifier for the resultant frequency.

Finally, the signals are fed to a threshold limit discriminator, and after a further amplification, to a relay which triggers the sorting or marking process.

With the present invention it is easily possible to detect any differences in quality or any deficiency of material just before the sorting takes place so that time delay elements are not needed. It is further possible with the present invention to control the goods directly at the bulk release mechanism and to carry out the sorting of the goods in a known manner by means of one or more pneumatic air valves.

The present invention opens a variety of application possibilities and may be used practically for all kinds of bulk goods under the most adverse conditions. For example, the present method may be used for sorting spar from dolomite, hard burnt lime from the soft material, and for recognizing and detecting deficiently treated or contaminated foodstuffs and drugs. The invention may also be used for supervising and sorting partially finished and finished products by checking the surface of these products with the reflected ray method. Moreover, by using, for example, X-rays and a fluorescent screen, the invention can be used to spot deficiencies in welded seams and cavities in cast or rolled pieces. It is also possible to use light with a defined wave length to test liquid streams and to separate undesired properties from such a liquid medium.

It is therefore an object according to the present invention to provide an improved method for sorting bulk goods with respect to quality differences and deficiencies by detecting penetrating and reflected radiant energy rays directed at the goods by means of a video sensing system.

It is a further object according to the present invention to provide a method of rapidly detecting the quality and deficiencies of bulk goods by means of a video camera, observing either reflected or penetrating energy rays directed at or through the bulk goods.

It is still a further object according to the present invention to provide a method for sorting bulk goods with radiant energy which is simple in design, easy to manufacture and reliable in operation.

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention as to which reference should be made to the appended claims.

In the drawings wherein similar reference characters denote similar elements throughout the several views:

FIG. 1 is a diagram partly in schematic of a video monitoring system according to the method of the invention, and FIG. 2 is a schematic representation of a video scanning system according to the method of the invention for directly analysing the results of a video camera directed at bulk goods in motion.

Referring to FIG. 1, there is shown a video monitoring screen 1 having a plurality of photocell detectors 2 secured to its screen for measuring the intensity of the light. The light amplitudes at the output of the photocells are fed to a resonant circuit 3 serving as a filter and having a center frequency of 15,625 cycles/second, for example. From resonant circuit 3 the light amplitude of the signals is fed to an amplifier having a rectifier 4 which transmits the signals to a threshold limit discriminator 5. A power switch 6 is connected to the output of threshold limit discriminator 5 for controlling the sorting or the bulk release mechanism respectively. The threshold limit discriminator, or the desired amplitude comparing arrangement, may be regulated and can be manually adjusted to the desired amplitude value. For each photocell scanning the picture screen, a system as described above is provided consisting of a filter, an amplifier, a threshold limit discriminator, and a power switch. In addition, automatic amplitude adjustment or correction of the discriminator may be provided since regulator 7, coupled to amplifier 4, provides at its output a signal for maintaining the discriminators to the desired amplitude level. Moreover, the regulator amplitude level may be used to electrically or mechanically correct the camera (not shown).

FIG. 2 shows schematically the possibility of analyzing signals produced by a television camera 8 without feeding the signals to a video monitoring screen with photocell detectors. The output signal of the television camera (picture amplitude and synchronizing portion, blanked signal) are fed through an isolation amplifier 9 to a desired number of adjustable amplifiers 10. Amplifiers 10 are controlled or turned on by a shift register having the same number of elements 11 as there are amplifiers 10. For practical purposes the rotational frequency of the shift register should be the same as the picture line frequency. The signals at the output of adjustable amplifiers 10 are fed to threshold limit discriminators 12. If the indicated light amplitude exceeds a predetermined value, monostable multi-vibrators 13 receive pulses from discriminators 12 and operate valves 14 to trigger the sorting process of the bulk goods.

The threshold limit discriminators 12 may be adjusted manually to the desired amplitude level. To automatically adjust threshold limit discriminators 12, a switch amplifying system may be added to sense the light amplitude of a comparator strip placed in the range of the camera. The light amplitude after passing through switching amplifier 10 and a regulator 15 is used for electrically or mechanically adjusting the television camera in a feedback loop arrangement. In place of this system, or in addition thereto, the threshold limit discriminator may be controlled by a further amplitude regulator 16 to provide forward acting regulation.

While only a few embodiments of the present invention have been shown and described, it will be understood that many changes and modifications may be made thereunto without departing from the spirit and scope of the invention as defined by the appended claims.

What is claimed is:

1. The method of sorting bulk goods in motion for determining quality difference, deficiencies and the like by projecting reflected or penetrating energy rays on the goods and sensing these rays with a video camera comprising the steps of:
    sweeping the picture lines of said camera laterally with respect to the movement of said goods;
    coupling the signal of at least one picture line to a shift register having $n$-elements, said shift register having a rotational frequency corresponding substantially to the length of one picture line;
    turning on $n$-video amplifiers in response to the outputs of each of the elements of said register, said amplifiers being connected to said camera; and
    sorting the bulk goods in response to the output signals of said amplifiers.

2. The method as recited in claim 2 wherein said step of sorting additionally comprises the step of sensing with a discriminator a predetermined threshold level at the output of the amplifier and producing a pulse responsive thereto, triggering a multi-vibrator with said pulse, and operating a valve connected to the output of said multi-vibrator.

3. The method as recited in claim 2 additionally comprising the steps of compensating said discriminators for fluctuations in amplifier gain and energy ray intensity by feeding back to said discriminators the signals produced at the output of said *n*-video amplifiers.

4. The method as recited in claim 3 additionally comprising the step of adjusting the sensitivity of the video camera with a switching amplifier which senses the light amplitude of a comparitor strip placed in the range of the video camera.

References Cited

UNITED STATES PATENTS

| 3,230,305 | 1/1966 | Kendrick | 209—111.5 |
| 3,389,789 | 6/1968 | Watson et al. | 209—111.7 X |

ALLEN N. KNOWLES, *Primary Examiner.*